Sept. 11, 1956 E. C. LASTER, SR 2,762,332
SPRINKLER AND STOCK WATERING SYSTEM
Filed Feb. 19, 1954 2 Sheets-Sheet 1

INVENTOR.
EDWARD C. LASTER SR.
BY
McMorrow, Berman & Davidson
ATTORNEYS

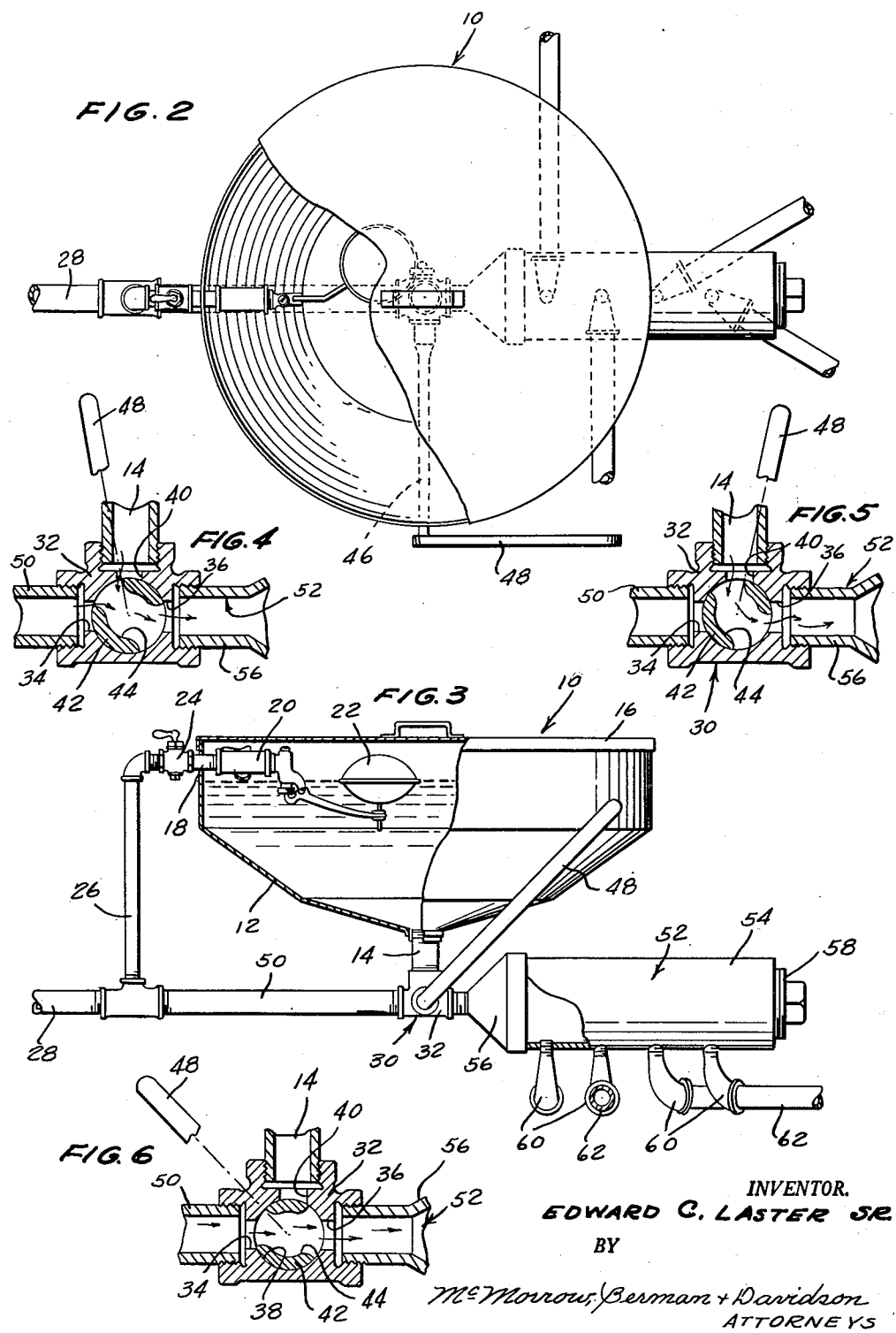

United States Patent Office 2,762,332
Patented Sept. 11, 1956

2,762,332

SPRINKLER AND STOCK WATERING SYSTEM

Edward C. Laster, Sr., Shreveport, La.

Application February 19, 1954, Serial No. 411,320

2 Claims. (Cl. 119—78)

This invention relates to a sprinkler and stock watering system and has for its primary object to maintain the drinking cups employed for watering stock in a clean and sanitary condition.

Another object is to maintain drinking water in a number of drinking cups or basins at a substantially uniform level and to automatically supply drinking water to a cup as it is being consumed.

A further object is to enable the system to be employed as a sprinkler system for supplying moisture to growing plants and the like.

The above and other objects may be attained by employing this invention which embodies among its features a group of drinking cups, a main water supply, a water level maintaining reservoir connected to the main water supply for receiving water therefrom and to the drinking cups for delivering water thereto and maintaining substantially constant the level of the water in the drinking cups, and means operatively connected to the main water supply and to the drinking cups for directing water from the main water supply to the drinking cups for flushing them and expelling foreign matter therefrom.

Other features include a single valve connected in the system for selectively controlling the flow of water from the water level maintaining reservoir or from the main water supply to the drinking cups and also to facilitate the draining of the reservoir during the cleaning thereof.

Still other features include means carried by the drinking cups and interposed in the flow of water thereto for creating a swirling motion in the water entering the drinking cups to facilitate the flushing of foreign matter therefrom when the drinking cups are connected to the main water supply.

In the drawings:

Figure 2 is an enlarged plan view of the water level maintaining reservoir showing a portion of the cover broken away to more clearly illustrate certain details of the invention;

Figure 3 is a side view of the reservoir illustrated in Figure 2, showing the portion broken away more clearly to illustrate the details of construction;

Figure 4 is an enlarged sectional view through the main control valve showing the turning plug thereof set in a position to drain the reservoir;

Figure 5 is a view similar to Figure 4, showing the turning plug in a position to supply water from the water level maintaining reservoir to the drinking cups;

Figure 6 is a view similar to Figure 4, showing the turning plug in a position in which a direct flow of water from the main water supply is maintained through the drinking cups;

Figure 1:
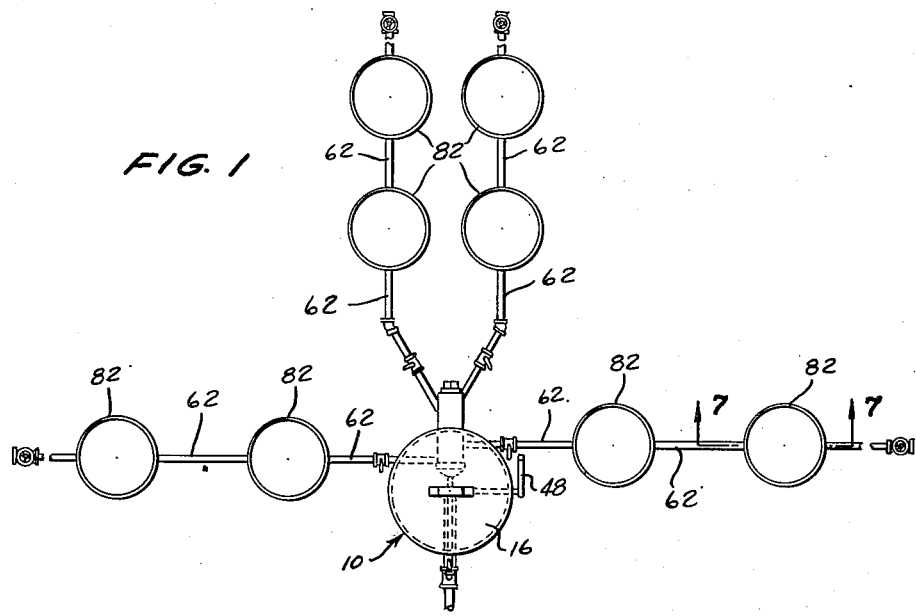
Figure 1 is a plan view of a system embodying the feature of this invention.
Figure 7:
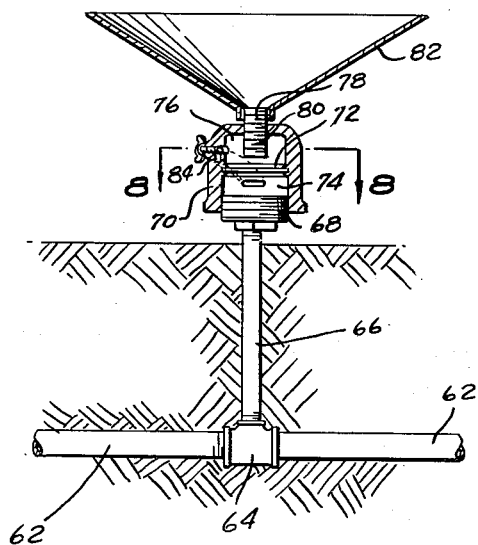
Figure 7 is a vertical sectional view on an enlarged scale taken substantially on the line 7—7 of Figure 1.
Figure 8:
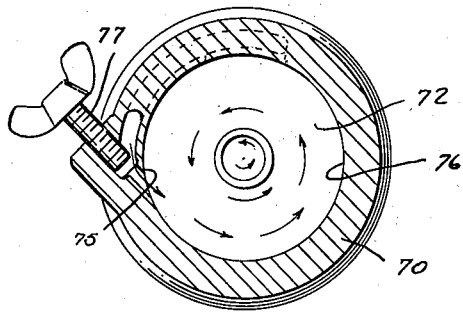
Figure 8 is a horizontal sectional view on an enlarged scale taken substantially on the line 8—8 of Figure 7.

Referring to the drawings in detail, this improved sprinkling and stock watering system comprises a water level maintaining reservoir designated generally 10 which includes a hollow body 12 having a substantially conical bottom to which is connected a water discharge pipe 14. The upper end of the body 12 is closed by a conventional cover 16 and extending through the side of the body 12 adjacent the upper end thereof is a nipple 18 to the inner end of which is coupled a conventional float valve 20 carrying a float 22 which through the medium of the valve regulates the height to which water may enter the reservoir. Connected to the nipple 18 on the outside of the reservoir 10 is a hand-controlled valve 24 which is connected through the medium of a suitable pipe or conduit 26 to a water main 28 or other main water supply by which water is supplied under pressure to the reservoir 10.

Coupled to the discharge nipple 14 is a three-way fitting designated generally 30 comprising a valve body 32 having aligned ports 34 and 36 extending therethrough which open into a transverse bore 38, as will be readily understood upon reference to Figures 4 through 6, inclusive. Communication with the transverse bore 38 and the pipe 14 is established through a port 40 and mounted in the transverse bore for rotation about the axis thereof and between the adjacent ends of the ports 34, 36 and 40 is a turning plug 42. The turning plug 42 is provided with a passage 44 which, as illustrated in Figures 4 through 6, inclusive, is of such a size that communication may be established between all three ports 40, 34 and 36, as illustrated in Figure 4, between the ports 40 and 36, as illustrated in Figure 5, or between the ports 34 and 36, as illustrated in Figure 6. The turning plug 42 is provided with a stem 46 carrying a hand lever 48 by means of which the position of the turning plug within the valve body 32 may be regulated to the various different positions illustrated in Figures 4 through 6, inclusive. Connected to the valve body 32 and communicating with the port 34 is a pipe 50 which in turn is connected to the main water supply 28, as will be readily understood upon reference to the drawings. It will thus be seen that when the turning plug is moved to the positions illustrated in Figures 4 and 6, communication will be established with the pipe 50.

Secured to the valve body 32 in communication with the port 36 therein is a water distributor 52 which comprises a relatively large tubular body 54 closed at one end by a conical fitting 56 which, as illustrated, is coupled to the valve 32, while the opposite end of the body 54 is closed by a conventional plug 58. Distributing fittings 60 are connected to the distributor 52, as will be readily understood upon reference to Figure 3, and coupled to the distributor 52 through the medium of the fittings 60 are distribution pipes 62 having T's 64 at spaced points which are connected with upwardly extending pipes 66, upon which are mounted the drinking cups to be more fully hereinafter described.

Threadedly connected to the upper end of each upwardly extending pipe 66 and above the level of the surface in which the pipe 66 is embedded is a bushing 68 upon which is threadedly engaged an inverted cup 70 having a transversely extending horizontally disposed partition 72 extending therethrough which separates the cup into lower and upper chambers 74 and 76, respectively. The upper end of the cup is provided with an internally screw threaded opening 78 through which extends a nipple 80 upon the upper end of which is threadedly engaged a bowl 82 defining the drinking cup. Formed in the cup 70 and communicating at its lower end with the chamber 74 is a passage 84. The upper end of the passage 84 communicates with the upper chamber 76 through a port 75 which extends substantially tangentially to the wall thereof to impart a swirling motion to the water as it enters the chamber 76. A valve 77 is threadedly engaged with the wall of the cup 70 in axial alignment with the port 75 for regulating the flow of water therethrough.

In use, it will be evident that with the valve 42 set in the position illustrated in Figure 5, with the passage 44 therein establishing communication between the ports 40 and 36 in the valve body 32, and with the valve 24 open, water entering the reservoir 10 will fill the reservoir until the float 22 rises to a predetermined height and operates the valve 20 to cut off the flow of water. As explained, with the valve 42 in the position illustrated in Figure 5, the water will flow from the reservoir downwardly through the valve 32 and distributor 52 to be distributed through the pipes 62 to the several cups 82 in which the level of the water is maintained by the float valve 20. When it is desired to flush the drinking cups 82 for the purpose of cleansing them, or for employing them in the capacity of sprinklers, the hand lever 48 is moved into the position illustrated in Figure 6, so that the passage 44 establishes direct communication between the ports 34 and 36 to establish a flow of water under pressure directly from the main source of supply 28 through the system and drinking cups 82. By reason of the passage of the water through the passage 84, a swirling motion will be imparted to the water entering the cups 82 to aid in dislodging any foreign substance which may be contained in the cups. When it is desired to drain the reservoir 10, the valve 24 is closed to shut off the supply of water to the reservoir from the main source of supply 28 and the hand lever 48 is moved into the position illustrated in Figure 4, so that water flowing through the pipe 50 from the source of supply 28 will act as a jet, as illustrated in Figure 4, to entrain the water contained in the reservoir 10 and discharge it through the distributor 52 and the rest of the system. Obviously, by the simple manipulation of the lever 48, the turning plug 44 of the valve 30 may be so adjusted as to control the flow of water through the distributor 52 and drainage of the reservoir 10 may readily be achieved. After the drainage of the reservoir 10, it may be restored to normal operation by opening the valve 24 and returning the turning plug 42 to the position illustrated in Figure 5.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a stock watering system, a water level maintaining reservoir, a water distributor, a three-way fitting having one branch connected in communication with said reservoir and a second branch connected in communication with said distributor, the third branch being connected in communication with a source of supply of water under pressure, a valve movably mounted in said fitting and controlling the communication of said distributor between said reservoir and said source of water supply, a plurality of upstanding pipes positioned adjacent said distributor and each having the lower end connected in communication with said distributor, an inverted cup carried by the upper end of each of said pipes, a horizontally disposed partition within each of said cups and dividing said cup into upper and lower chambers, a drinking bowl carried by each of said cups and connected in communication with the upper chamber of the adjacent cup, each of said cups being provided with a passage establishing communication between the lower and upper chambers of each cup and imparting a swirling motion to water passing through the adjacent upper chamber and entering the adjacent bowl, and hand actuable means operatively connected to said valve for effecting the movements of said valve.

2. In a stock watering system, a water level maintaining reservoir, a water distributor, a three-way fitting having one branch connected in communication with said reservoir and a second branch connected in communication with said distributor, the third branch being connected in communication with a source of supply of water under pressure, a valve movably mounted in said fitting and controlling the communication of said distributor between said reservoir and said source of water supply, a plurality of upstanding pipes positioned adjacent said distributor and each having the lower end connected in communication with said distributor, an inverted cup carried by the upper end of each of said pipes, a horizontally disposed partition within each of said cups and dividing said cup into upper and lower chambers, a drinking bowl carried by each of said cups and connected in communication with the upper chamber of the adjacent cup, each of said cups being provided with a passage establishing communication between the lower and upper chambers of each cup and imparting a swirling motion to water passing through the adjacent upper chamber and entering the adjacent bowl, a valve movably carried by each of said cups and extending into the passage of the cup for regulating the flow of water therethrough, and hand actuable means operatively connected to said first named valve for effecting the movements of said first named valve.

References Cited in the file of this patent
UNITED STATES PATENTS

| | | |
|---|---|---|
| 1,204,156 | Hubbell | Nov. 7, 1916 |
| 2,106,871 | Hogsett | Feb. 1, 1938 |
| 2,292,020 | Venolia | Aug. 4, 1942 |
| 2,474,469 | De La Grange | June 28, 1949 |
| 2,496,030 | Winey | Jan. 31, 1950 |
| 2,502,720 | Haley | Apr. 4, 1950 |

FOREIGN PATENTS

| | | |
|---|---|---|
| 8,774 | France | Apr. 16, 1908 |

(First addition to No. 373,753)